United States Patent [19]

Kollross

[11] Patent Number: 4,562,617
[45] Date of Patent: Jan. 7, 1986

[54] METHOD AND APPARATUS FOR MAKING SAUSAGE AS A SLICED PRODUCT

[76] Inventor: Günter Kollross, Am Wallerstädter Weg 20, D-6080 Gross Gerau-Dornheim, Fed. Rep. of Germany

[21] Appl. No.: 481,301

[22] Filed: Apr. 1, 1983

[30] Foreign Application Priority Data

Apr. 1, 1982 [DE] Fed. Rep. of Germany ....... 3212121

[51] Int. Cl.$^4$ ............................................. A22C 11/00
[52] U.S. Cl. .......................................... 17/49; 17/33; 17/1 R
[58] Field of Search .................... 17/49, 1 R, 1 F, 33, 17/35; 53/122, 576, 530

[56] References Cited

U.S. PATENT DOCUMENTS

| | | | |
|---|---|---|---|
| 4,017,941 | 4/1977 | Raudys et al. | 17/49 X |
| 4,028,775 | 6/1977 | Tysver | 17/49 |
| 4,160,305 | 7/1979 | Tysver | 17/49 |
| 4,335,488 | 6/1982 | Becker | 17/49 X |

Primary Examiner—Willie G. Abercrombie
Attorney, Agent, or Firm—Larson and Taylor

[57] ABSTRACT

When making sausage as a sliced product such that, first, a tubular packing sheath, which has been slipped over a filling tube until it reaches its closed end, is filled with ground meat through the filling tube up to a predetermined length and is then tied up and closed at the other end and the completed sausage arising therefrom, after proper intermediate treatment accompanied by a removal of the sausage tips, is further cut into slices, a closing piece, which is flat on one side at least, is introduced according to the invention together with the ground meat into the packing sheath at the beginning and end thereof, and is of a size slightly smaller, if at all, than the cross section of the filling tube and which, after the intermediate treatment, is again removed together with the sausage tip. By using such a process, the losses of ground meat in the sausage tips are drastically reduced without impairing the optical quality of the packed sausage slices.

16 Claims, 11 Drawing Figures

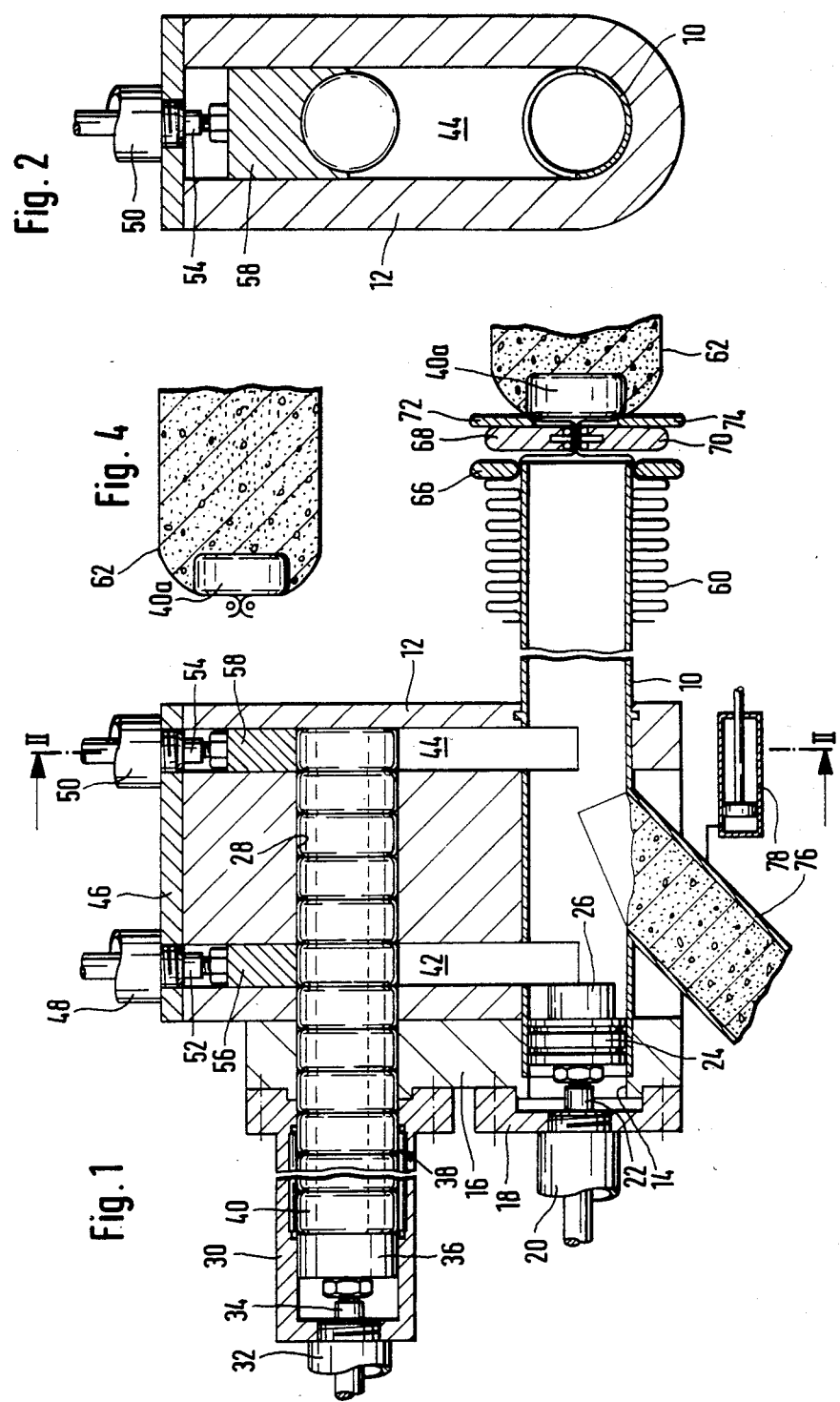

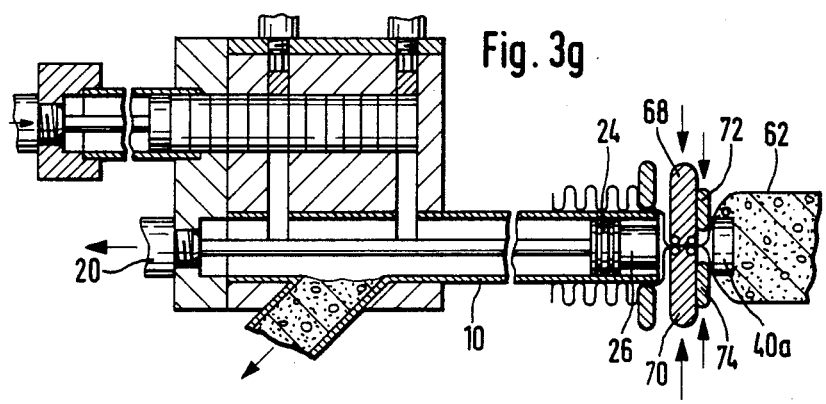
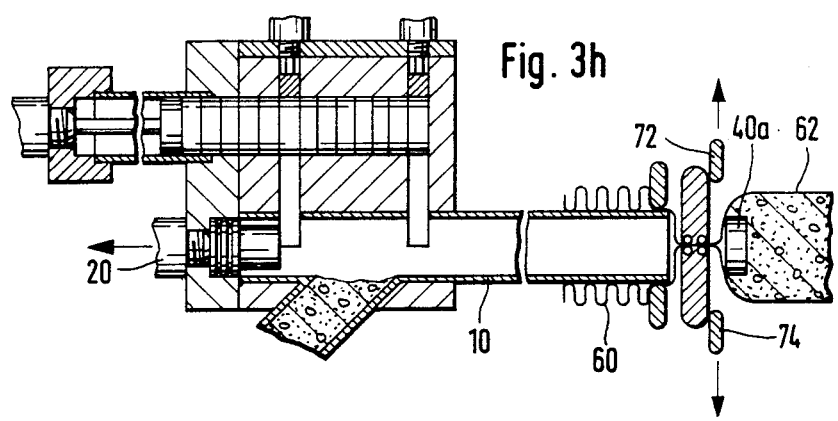

METHOD AND APPARATUS FOR MAKING SAUSAGE AS A SLICED PRODUCT

FIELD OF THE INVENTION

The invention relates to a method of making sausage as a sliced product, wherein, first, a tubular packing sheath, which has been slipped over a filling tube until it reaches its closed end, is filled with ground meat through the filling tube to a predetermined length and then tied up and closed at the other end, and wherein the completed sausage arising therefrom, after proper intermediate treatment accompanied by a removal of the sausage tips, is further cut into slices, as well as a closing piece used therefor and a device for carrying out such a process.

BACKGROUND OF THE INVENTION

The proportion of sliced and prepackaged sausages in relation to the total sales of sausage products has been increasing steadily. At the same time, the clientele's demands for the outward appearance of the packaged product with respect to the identical size of the sausage slices have also increased. Slices that diminish in diameter from the tip area can only be sold with difficulty and are underpriced at best. On the other hand, tapering sausage tips are unavoidable in the sausage-making processes known heretofore. The producers of sliced products are therefore obliged to put up with considerable losses of profit due to waste or reduced proceeds for the contents of the sausage tips.

SUMMARY OF THE INVENTION

It is the object of the invention to eliminate this disadvantage and to drastically reduce the losses of ground meat in the sausage tips without impairing the optical quality of the packaged sausage slices.

The invention solves this problem by means of a process wherein there is introduced into the packing sheath at the beginning and end thereof a closing piece which is flat on one side at least and is of a size which is slightly smaller, if at all, than the cross section of the filling tube, said closing piece after the intermediate treatment being again removed together with the sausage tip. Such a closing piece takes up a considerable part of the tip interior which heretofore has been completely filled up by the sausage ground meat and, hence, reduces the loss of ground meat in the sausage tips.

According to the method of the invention, it is particularly advantageous to reuse the closing pieces in the prescribed manner after their removal and, possibly, intermediate cleaning as many times as desired.

During the section-by-section filling, tying up, and closing of pre-pleated tubular packing sheaths, as known in the prior art, into a strand of any desired length, the method according to the invention is used to advantage by introducing with each filling operation a closing piece in front and in back of the inserted ground meat.

A closing piece for use in the process according to the invention is appropriately distinguished by the fact that it has the form of a circular disk or cylinder with flat end faces on either side. Since the closing pieces take up a large portion of the sausage tip volumes, the loss due to waste or inferior product that can only be sold if underpriced is reduced considerably, thus increasing the total proceeds. It stands to reason that the loss is the less, the greater the diameter of the closing pieces in relation to the sheath diameter. Since the sheath diameter is necessarily greater than the outside diameter of the filling tube, but on the other hand the diameter of the closing pieces can attain the width of the filling tube at the most, there remains in the tapering sausage tip, even if the closing pieces are used in accordance with the invention, a volume fraction which is filled with ground meat. This volume fraction could only be fully eliminated if it is possible to create closing pieces which, after exiting from the filling tube, increase their diameter to the full width of the sheath.

Advantageously, an apparatus for carrying out the method of the invention is distinguished by an elongated cylinder which forms the filling tube and in which a piston moves between a front terminal position at the filling-tube orifice and a rear terminal position remote therefrom, whereby in the cylinder a ground-meat feed channel opens out in front of the rear terminal position of the piston and the cylinder wall has in front and in back of this orifice a closable orifice for the lateral introduction of the closing piece.

BRIEF DESCRIPTION OF THE DRAWINGS

Further features for the advantageous construction of this apparatus are apparent hereinbelow.

The invention will be explained in detail below with reference to an embodiment of an apparatus shown in the drawings for carrying out the method according to the invention, wherein:

FIG. 1 shows the apparatus in a horizontal longitudinal section in the position of rest prior to the beginning of a new filling operation, FIG. 2 is a cross-sectional view taken along the line II—II in FIG. 1, FIGS. 3a–h are reduced and schematized longitudinal sections similar to FIG. 1 in eight different phases of a filling and clipping.

FIG. 4 shows in longitudinal section a sausage tipe with a closing piece contained therein.

DETAILED DESCRIPTION OF THE PREFERRED EMBODIMENTS

Figure 3A:
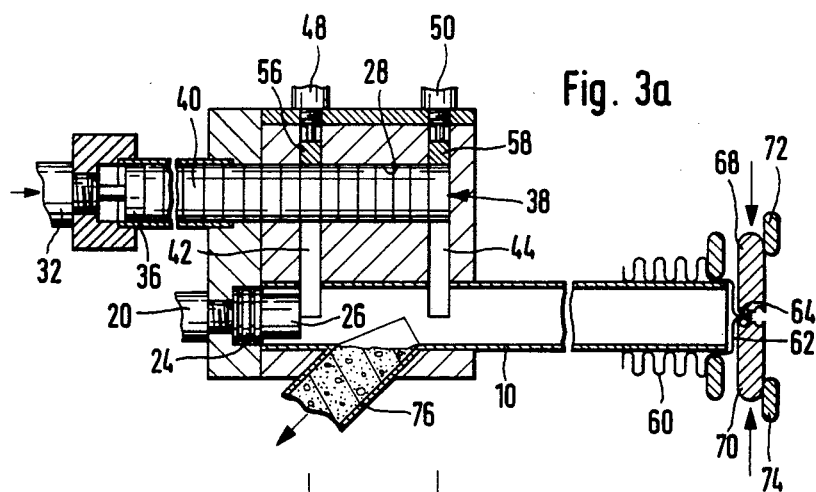

According to FIG. 1, a cylindrical filling tube 10 is received with its rear terminal section in a block-shaped holder 12 and projects at the end into a bore 14 within a plate 16 attached to the holder 12. The bore 14 is closed by a cover 18 which is removably attached to the plate 16, which cover receives in a smaller bore the front end of a power cylinder 20. The power cylinder 20 has approximately the same length as the filling tube cylinder 10 and, for reasons of space, is shown broken away for the most part. The piston rod 22 of the power cylinder 20 projects into the filling-tube cylinder 10 and supports on the free end a piston 24 which moves sealingly therein and has a tapered cylindrical lug 26 on the front end. The piston 24 can move with the aid of the power cylinder 20 from the pulled-back position shown in FIG. 1 to a position indicated by a solid line in FIG. 3f, in which position only a last piston section is still received in the filling tube.

In the block-shaped holder 12 there is provided parallel to the filling-tube cylinder 10 a bore 28 having the same diameter as the inside diameter of the filling-tube cylinder. The bore 28 continues in the plate 16 as well as in a pot-shaped magazine holder 30 which is removably attached thereto and which receives in its end wall provided with a smaller bore a power cylinder 32 which is again shown broken away for the most part. The front end of the bore 28 within the holder 12 is closed.

The piston rod 34 of the power cylinder 32 supports on the free end a cylindrical pressure piece 36 to pressurize a stack 38 of closing pieces 40 which are lined up one behind the other in the bore 28.

The closing pieces 40 have the form of a circular disk or cylinder and appropriately consist of a heat-resistant plastic with a temperature stability such that the pieces can be cleaned in boiling water for sterilization purposes. The axial length of all the closing pieces 40 is exactly the same.

To be able to introduce the closing bodies 40 into the bore 28, the magazine holder is appropriately affixed to the plate 16 with a snap fastener (not shown).

In the block-shaped holder 12 there are located at a distance corresponding to the divisions between two bodies 40 of the stack 38 two cross channels 42, 44 which run into the filling tube 10 provided with suitable openings. The cross channels 42, 44 are matched in cross section to the closing pieces and extend as far as the outer surface of the holder 12 on which is mounted a cover 46 suitably attached thereto. The cover 46 supports two power cylinders 48, 50 again shown as broken away for the most part, to each of whose piston rods 52, 54 projecting into the cross channels 42, 44 a slide valve 56, 58 is attached.

The slide valves 56, 58 fill up the entire cross section of the cross channels 42, 44 and are adapted on their end faces to the curvature of the cylinder bore. When the power cylinders 48, 50 have moved in, the slide valves 56, 58 free the cross section of the magazine bore 28 so that the stack 38 of the closing pieces 40 contained therein can be made to bear on the closed end of the bore 28 by the power cylinder 32 and held there. When, on the other hand, the power cylinders 48, 50 move out, each slide valve 56, 58 seizes a closing piece 40 from the stack 18 and moves it through the associated cross channel 42 or 44 into the filling-tube cylinder 10, whereby the end faces of the slide valves complement and close the cylinder wall at the junction of the cross channels 42, 44.

The filling tube 10 has a suitable free length for the reception, in a per-se known manner, of a tubular packing sheath 62 pleated into a so-called caterpillar 60 made from a synthetic sausage-sheathing material whose front end is closed by a metal clamp 64, a so-called "clip". A gut brake 66 embraces in a known manner the orifice end of the filling tube 10 with a packing sheath 62 and sees to it that during the filling of the packing sheath with ground meat a sufficiently large pull resistance is maintained to cause the sausage sheath to be filled to bursting.

Immediately ahead of the orifice of the filling-tube cylinder 10 there is placed a tying-up and clip-mounting means formed by two jaws 68, 70 that can move relatively to each other so as to mount two neighboring closing clips. The construction of such a double clip device is known in the prior art and need therefore no further explanation.

Finally, there are provided in front of the tying-up and clip-mounting device 68, 70 two additional jaws 72, 74 which move relatively to each other and form a retaining means whose function will be explained further below.

A ground-meat feed channel 76 connected to a sausage-filling machine (not shown) runs at an acute angle into the filling tube cylinder 10 between the cross channels 42, 44 and preferably has the same cross section as the filling-tube cylinder. A ground-meat recirculation pump 78 is connected to the ground-meat feed channel 76 in a known fashion and is shown only schematically.

The filling-tube cylinder 10 with the ground-meat feed channel 76 as well as the whole closing-piece magazine are placed under vacuum during operation in a per-se known manner.

The process according to the invention is carried out with the apparatus shown, as follows:

Let it first be assumed that, as shown in FIG. 3a, a packing sheath 62 in the form of a caterpillar 60 and closed on the front end by a closing clip 64 is slipped over the filling-tube cylinder 10 and the gut brake 66 is slipped over the end of the filling tube. The jaws 68, 70 of the tying-up and clip-mounting device are closed and the retaining jaws 72, 74 are closed. The power cylinder 20 has moved in completely so that the piston 24 with the tapered cylindrical lug 26 opens the cross channel 42. The power cylinders 48, 50 have likewise moved in and the magazine bore 28 is filled with a stack 38 of closing pieces 40 upon which rests the pressure piece 36 under the action of the power cylinder 32. The filling machine has stopped and the ground-meat recirculation pump 78 holds the ground meat contained in the ground-meat feed channel 76 under vacuum in such a way that the filling-tube cylinder 10 is free from sausage ground meat.

Figure 3B:
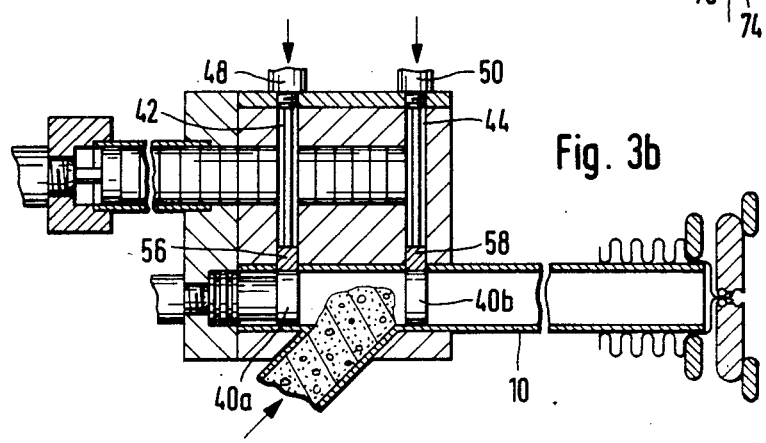

The power cylinders 48, 50 are now activated so that a closing piece 40a or 40b is moved by means of the slide valve 56, 58 through the cross channels 42, 44 into the filling-tube cylinder 10. At the same time the filling machine is switched in (FIG. 3b).

Figure 3C:
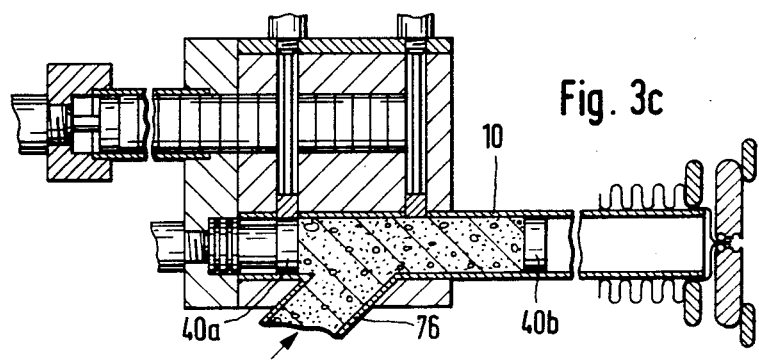
Figure 3D:
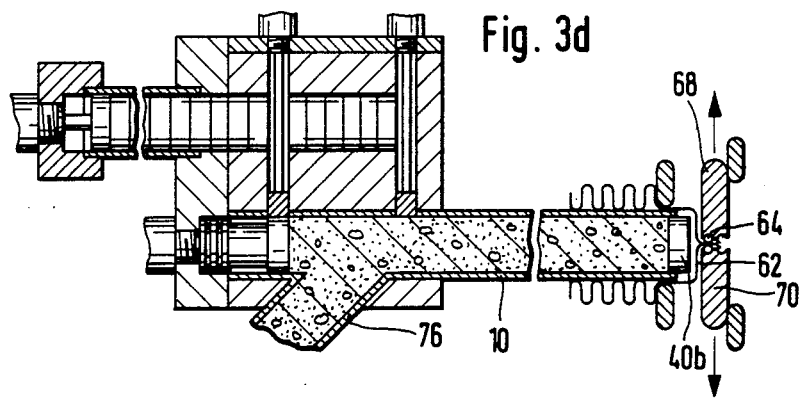
Figure 3E:
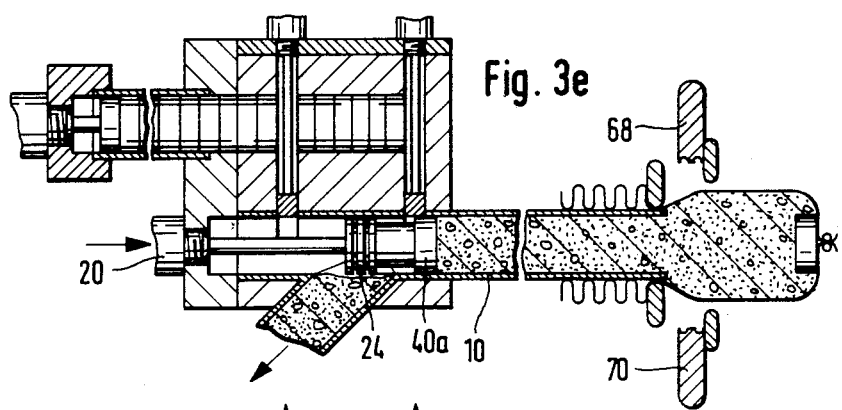

As ground meat is increasingly advanced through the ground-meat feed channel 76, the space between the closing pieces 40a and 40b is filled up with ground meat (FIG. 3c) and the front closing piece 40 is moved increasingly forward by the filling tube 10 until it arrives at the front end of the packing sheath 62 which is closed by the closing clip 64 (FIG. 3d).

Figure 3F:
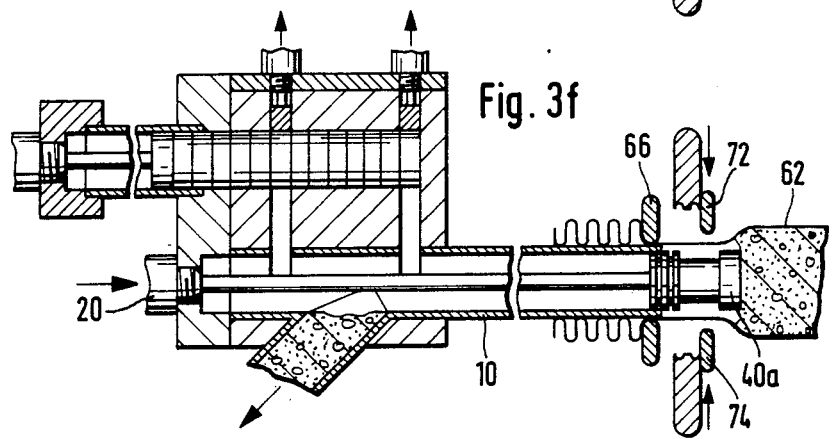

Thereupon, the jaws 68, 70 of the tying-up and clip-mounting device are opened, while at the same time the filling machine is switched off and the ground-meat recirculation pump 78 switched in. The power cylinder 20 now moves out and with the piston 24 it shifts the closing piece 40a forward (3e) through the filling tube 10 until finally the entire sausage material with the rear closing piece 40a has been pressed out of the filling-tube cylinder and into the packing sheath 62 which runs under the gut brake 66 from the filling tube (FIG. 3f).

The rear closing piece 40a is in this position before the retaining jaws 72, 74 which are now moved relatively to each other and hold the closing piece 40a in position, while the power cylinder 20 is moved back with the piston 24 until the lug 26 within the filling-tube cylinder 10 comes to a stop. In this position, the jaws 68, 70 of the tying-up and clip-mounting device (FIG. 3g) close, tie up the packing sheath 62 and mount two new closing clips at a short distance from each other, the front clip closing off the just-prepared sausage and the rear clip the front closing piece of the next packing sheath.

The retaining jaws 72, 74 now open and the power cylinder 20 moves back into the initial position shown in FIG. 3h, from which a new filling procedure can be initiated in the order of sequence described above.

Since the whole apparatus is under vacuum, the formation of harmful air cushions are practically avoided.

FIG. 4 shows the rear tip of a sausage made with the apparatus that has been described with the closing piece 40a contained therein which, after proper treatment, is cut off from the sausage and, after appropriate cleaning, is reused. As can be seen in FIG. 4, the closing piece 40a takes up a considerable portion of the tip volume and reduces in this way the loss of ground meat which cannot be used for the sliced product.

I claim:

1. A method of making a sausage which is closed at each end, the sausage being designed to subsequently undergo an intermediate treatment and thereafter be sliced; the method of sausage making comprising the steps of:

slipping a tubular packing sheath over a filling tube having a closed end of the sheath proximate the end of the filling tube;

introducing ground meat into the filling tube from a feed channel opening spaced from the end of the filling tube;

introducing closing pieces into the filling tube on each side of the feed channel opening from which the ground meat is introduced in the filling tube, the closing pieces having a flat side on the side engaging the ground meat and being sized equal to or smaller than the cross section of the filling tube;

filling the sheath with ground meat from the filling tube to a desired length with the closing pieces at each end of the length; and closing the end opposite the closed end of the sheath such that the closing pieces are contained in such ends.

2. The method according to claim 1, characterized in that the closing pieces, after their removal are subjected to an intermediate cleaning, and are then reused in the prescribed manner as many times as desired.

3. The method according to claim 1 or 2, characterized in that during a section-by-section filling and closing of the tubular packing sheaths into a strand of any desired length, there is introduced with each filling operation a closing piece in front and in back of the filled-in ground meat.

4. An apparatus for making a sausage which is closed at each end, the sausage being designed to subsequently undergo an intermediate treatment and thereafter be sliced; the apparatus comprising:

an elongated cylinder forming a hollow filling tube, said cylinder including an end orifice, and about which is tubular packing sheath is mounted for filling;

a piston located in said cylinder and movable between a front terminal position at one end of said cylinder adjacent said end orifice to a rear terminal position remote therefrom;

a feed channel opening in said cylinder, in front of the rear terminal position of said piston whereby ground meat is fed into said cylinder in front of said piston;

a first and a second closable opening in said cylinder located, respectively, on each side of said feed channel opening and between the rear terminal position and front terminal position of said piston; and first and second closing pieces having a flat side and being sized equal to or smaller than the hollow cross section of said cylinder which are introduced respectively through said first and second opening and ground meat is introduced through said feed channel opening while said piston is at the rear terminal position such that upon movement of said piston to the front terminal position the tubular packing sheath is filled with ground meat sandwiched between said closing pieces.

5. The apparatus according to claim 4 wherein said closing piece is characterized in that it has the form of a circular disk or cylinder with flat end faces on either side.

6. The apparatus according to claim 5, characterized in that the disk material is boil-proof.

7. The apparatus according to claim 6, characterized in that the closing piece consists of heat-resistant plastic.

8. The apparatus according to claim 4, characterized in that the ground-meat feed channel opens into the filling tube at an acute angle.

9. The apparatus according to claim 4 and further including a ground-meat recirculation pump for said ground-meat feed channel.

10. The apparatus according to claim 4, characterized in that the piston is operated by a power cylinder via a piston rod attached to the backside thereof.

11. The apparatus according to claim 4, characterized in that the piston supports on its front side a tapered cylindrical lug with which the piston projects in its front terminal position from the filling tube, and that there is placed in front of the filling tube a tying-up and clip-mounting device.

12. The apparatus according to claim 11, characterized in that the tying-up and clip-mounting device is constructed for the simultaneous mounting of two closing clips.

13. The apparatus according to claim 4, characterized by including a magazine proximate the filling-tube cylinder for the closing pieces and a mechanical feeding device for introducing the closing pieces into the filling-tube cylinder through the closing piece openings.

14. The apparatus according to claim 13, characterized in that the magazine has a channel which extends parallel to the filling-tube cylinder to receive a stack of closing pieces and which is traversed by two cross channels leading to the insert openings in the cylinder, in which cross channels there is each placed a power-driven slide valve for the transfer of a closing piece to the filling-tube cylinder.

15. The apparatus according to claim 14, characterized in that the end face of the slide valves are adapted to the filling-tube curvature.

16. The apparatus according to claim 14 or 15, characterized in that the slide valves are operated by power cylinders.

* * * * *